United States Patent [19]
Ota et al.

[11] Patent Number: 5,446,815
[45] Date of Patent: Aug. 29, 1995

[54] OPTICAL COLLIMATOR ARRAY INCLUDING A SPACER FOR RECEVING A MICROLENS AND METHOD OF ALIGNING LIGHT AXES THEREOF

[75] Inventors: Takashi Ota, Kasugai; Masashi Fukuyama, Nagoya, both of Japan

[73] Assignee: NGK Insulators, Ltd., Japan

[21] Appl. No.: 208,273

[22] Filed: Mar. 10, 1994

[30] Foreign Application Priority Data

Mar. 11, 1993 [JP] Japan ................................. 5-050866
Feb. 15, 1994 [JP] Japan ................................. 6-018363

[51] Int. Cl.6 .................................................. G02B 6/32
[52] U.S. Cl. ...................................... 385/33; 385/83
[58] Field of Search .................. 385/33, 34, 35, 83, 385/74, 76, 77, 78

[56] References Cited

U.S. PATENT DOCUMENTS 5,241,612  8/1993  Iwama ........................... 384/74
5,257,332  10/1993  Pimpinella ..................... 385/74

FOREIGN PATENT DOCUMENTS 60-243609  12/1985  Japan ........................... 385/34
5-273442  10/1993  Japan ........................... G02B 6/40
5-333225  12/1993  Japan ........................... G02B 6/24

OTHER PUBLICATIONS

Technical Report of IEICE, A.P92-78, SS392-70 (1992-10) (Abstract attached).

Primary Examiner—Rodney B. Bovernick
Assistant Examiner—John Ngo
Attorney, Agent, or Firm—Parkhurst, Wendel & Rossi

[57] ABSTRACT

An optical collimator array having an optical fiber array for aligning and fixing optical fibers, and a microlens array formed by arranging lenses integrally and connected to the optical fiber array with a predetermined distance, has a spacer for fixing the microlens array connected to said optical fiber array in such a manner that light axes at an end of the optical fibers in the optical fiber array are made coincident with those of said lenses in the microlens array.

6 Claims, 7 Drawing Sheets

FIG_1

FIG_2

FIG_5

FIG_6

FIG_7

FIG_8

FIG_9

FIG_10

FIG_11

FIG_12

FIG_13

FIG_14

FIG_15a

FIG_15b

OPTICAL COLLIMATOR ARRAY INCLUDING A SPACER FOR RECEVING A MICROLENS AND METHOD OF ALIGNING LIGHT AXES THEREOF

BACKGROUND OF THE INVENTION

1. Field of the Invention

The present invention relates to an optical collimator comprising an optical fiber array for aligning and fixing optical fibers, and a microlens array arranged near the optical fiber array at a predetermined distance and a method of aligning optical axes of the optical collimator.

2. Description of the Related Art

Recently, an array of Exiton Absorption Reflection Switch (EARS) having a signal regeneration function is paid attention to in, for example, TECHNICAL REPORT OF IEICE A-P92-78, SSE92-70 (1992-10) "Experiment digital free-space photonic switch". In this EARS, an optical collimator array is used at a light incident portion and a light exit portion thereof. This optical collimator array functions to supply light signals emitted through optical fibers into a two-dimensional photonic device as parallel light.

The optical collimator array comprises an optical fiber array for aligning and fixing optical fibers, and a microlens array arranged near the optical fiber array at a predetermined distance. In the optical collimator mentioned above, one end portion of the optical fiber array is faced to one end of the microlens array at a distance substantially equal to a focal length of the microlens array. Therefore, diverging light emitted from the optical fiber array is converted into parallel light.

As to a manufacturing method of the optical collimator array mentioned above, it is assumed that the optical fiber array and the microlens array are arranged on the same substrate and are spaced at a distance substantially equal to a focal length. However, in the manufacturing method mentioned above, it is very difficult to arrange the optical fiber array and the microlens array with a distance substantially equal to a focal length and to make coincident axes of the optical fibers of the optical fiber array with axes of the microlens array. Moreover, in the construction mentioned above, a strength of the optical collimator array is lowered and a handling of the optical collimator array becomes difficult.

That is to say, in order to align the light axes in the optical collimator array having the construction mentioned above, light is made incident upon one end of the optical fiber array being opposite to an end facing to the microlens array, and then light emitted from the microlens array is picked up by for example CCD camera and is displayed on a monitor. Then, spots of the light displayed on the monitor are aligned in one direction by moving the optical fiber array and the microlens array relatively. After the spots are aligned in the manner mentioned above, the optical fiber array and the microlens array are connected by using for example adhesives of ultraviolet hardening type.

Figure 15A:
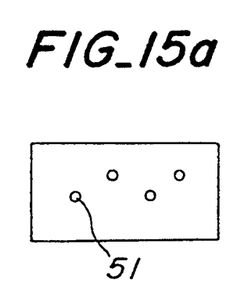
FIGS. 15a and 15b are schematic views for explaining drawbacks of a conventional optical collimator array.
Figure 15B:
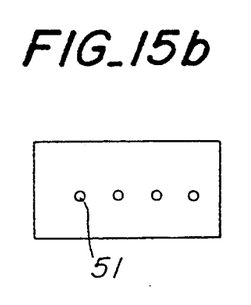

In the method mentioned above, if a positional relation between the optical fiber array and the microlens array is varied, the spots on the monitor (4 optical fibers in the optical fiber array) are not aligned in one direction as shown in FIG. 15(a), and thus it is understood that the optical fiber array and the microlens array are not arranged properly. However, if the optical fiber array and the microlens array are varied in a thickness direction i.e., parallel, the spots on the monitor are aligned in one direction i.e., on the line, and thus it is not understood that the optical fiber array and the microlens array are not arranged properly. Therefore, in the latter case, it is not possible to make completely coincident the light axes of the optical fibers in the optical fiber array with the light axes of the microlens in the microlens array.

SUMMARY OF THE INVENTION

It is an object of the invention to eliminate the drawbacks mentioned above and to provide an optical collimator array which has a high strength and can arrange an optical fiber array and a collimator array easily with a predetermined distance.

According to the invention, an optical collimator array having an optical fiber array for aligning and fixing optical fibers, and a microlens array formed by arranging lenses integrally and connected to said optical fiber array with a predetermined distance, comprises a spacer for fixing said microlens array connected to said optical fiber array in such a manner that light axes at an end of said optical fibers in said optical fiber array are made coincident with those of said lenses in said microlens array.

Another object of the invention is to provide a method of aligning light axes of the optical fiber array and light axes of the microlens array properly in a coincident manner.

According to the invention, a method of aligning light axes of an optical collimator array having an optical fiber array for aligning and fixing optical fibers, and a microlens array formed by arranging lenses integrally and connected to said optical fiber array with a predetermined distance, comprises the steps of; arranging reference optical fibers at both side portions of and on the same plane of said optical fibers of said optical fiber array; emanating a light beam upon said optical fibers and said reference optical fibers; picking up light beams emitted from said microlens through said optical fibers of said optical fiber array, and light beams emitted directly from said reference optical fibers; displaying said picked up light beams as light spots on a monitor; and adjusting a positional relation between said optical fiber array and said microlens array in such a manner that light spots of said microlens array exist on a reference line generated between light spots of said reference optical fibers.

In the construction of the collimator array mentioned above, since the optical fiber array, the spacer, and the microlens array are connected integrally to form the collimator array, it is possible to manufacture easily the optical collimator array having a high strength, and thus it is possible to provide easy handling of the optical collimator array. Moreover, the spacer has a recess with window portion having a depth with respect to the face thereof connected to the optical fiber array. Therefore, if the microlens array is set in the recess window portion of the spacer in which one end portion of the microlens array is disposed to the window, and the spacer integrally connected with the microlens array is fixed to the optical fiber array, it is possible to adjust a distance between one end of the optical fiber array and one end of the microlens array at a predetermined distance i.e., a focal length precisely. As a result, it is possible to increase a converting efficiency from diverging light to parallel light.

In the construction of the method of aligning light axes in the collimator array mentioned above, at least one set of reference optical fibers is arranged at both side portions of the optical fibers in the optical fiber array, and an axes adjustment between the optical fibers and the microlenses is performed by referring a line on the monitor generated between one reference fiber and the other reference fiber. In this case, even if the optical fiber array and the microlens array are varied in a thickness direction i.e., parallel, the spots on the monitor are not aligned in one direction i.e., on the line, and thus it is understood that the optical fiber array and the microlens array are not arranged properly. Therefore, it is possible to perform a light axes alignment between the optical fibers and the microlenses precisely in an easy manner.

DESCRIPTION OF THE PREFERRED EMBODIMENTS

Figure 1:
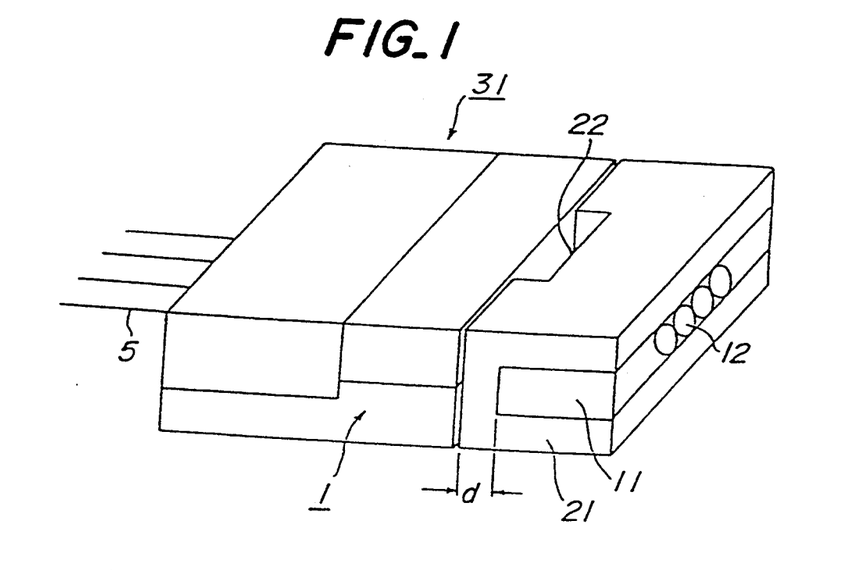
FIG. 1 is a schematic view showing one embodiment of an optical collimator array according to the invention.

FIG. 1 is a schematic view showing one embodiment of an optical collimator array according to the invention. In the embodiment shown in FIG. 1, a numeral 1 is an optical fiber array for aligning a plurality of optical fibers 5 in one direction. In this embodiment, four optical fibers 5 are used. Moreover, a numeral 11 is a microlens array formed by integrally arranging a plurality of GRIN(Gradient Index) lenses 12 in one direction, the number of which corresponds to the number of the optical fibers in the optical fiber array 1. Further, a numeral 21 is a spacer for fixing the microlens array 11. The microlens array 11 is fixed to the spacer 21 in such a manner that one end of the microlens array 11 is disposed at a recess portion 22 of the spacer 21. Then, an optical collimator array 31 is obtained by connecting the spacer 21 to the optical fiber array 1 in such a manner that light axes at an end of the optical fibers 5 of the optical fiber array 1 are made coincident with those of GRIN lenses 12 of the microlens array 11 disposed at the recess portion 22.

Figure 2:
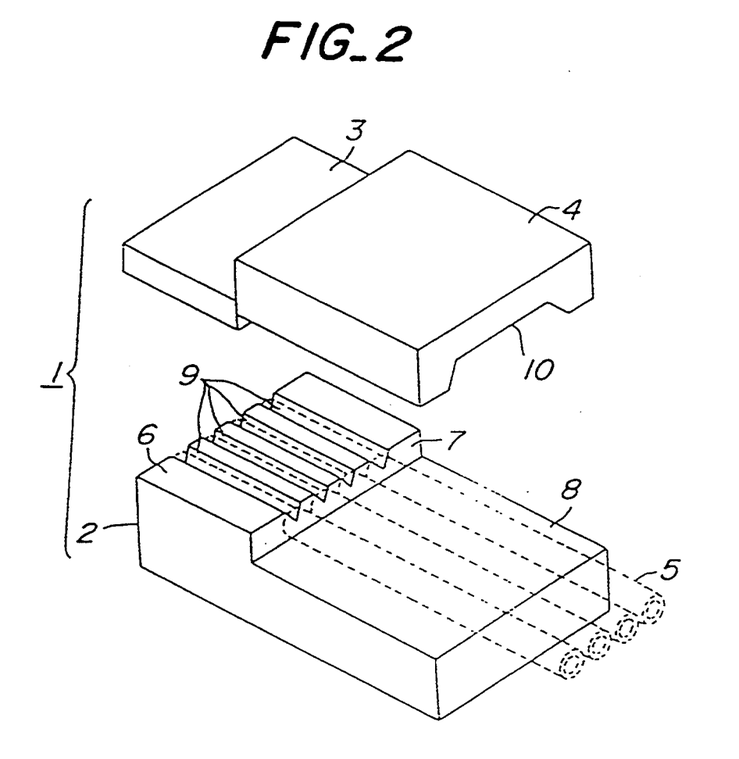
FIG. 2 is a schematic view illustrating one embodiment of an optical fiber array according to the invention.

As to the optical fiber array 1, it is preferred to use an optical fiber array disclosed in U.S. patent application Ser. No. 08/070619. FIG. 2 is a schematic view showing the optical fiber array 1 mentioned above. In this embodiment, the optical fiber array 1 comprises a V groove substrate 2, a fiber fix substrate 3 and upper substrate 4, and a predetermined number of optical fibers 5 (in this case, four optical fibers 5) are fixed in the optical fiber array 1. The V groove substrate 2 comprises an upper plane 6 and a lower plane 8 connected to the upper plane 6 via a step 7. In the upper plane 6, V grooves 9 for accommodating the stripped optical fibers 5 one by one are formed, The fiber fix substrate 3 is arranged on the upper plane 6 of the V groove substrate 2, and is used for fixing the stripped optical fibers 5 in each center of the V grooves 9. The upper substrate 4 is arranged on the lower plane 8 of the V groove substrate 2. In a lower portion of the upper substrate 4, a recess portion 10 is formed for accommodating cover portions of the optical fibers 5.

The microlens array 11 having a predetermined number of the GRIN lenses 12 is formed by cutting an array of GRIN lenses 12 arranged one dimensionally or two dimensionally, which can be obtained on the market. In this case, an arranging pitch of the GRIN lenses 12 is completely equal to an arranging pitch of the optical fibers 5. Moreover, it does not matter that the GRIN lens 12 of the microlens array 11 are arranged in a portion not disposed to a window of the recess portion 22.

Figure 3A:
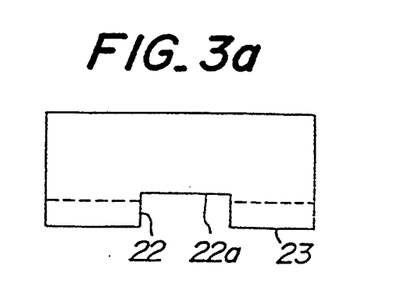
FIGS. 3a to 3c are schematic views respectively depicting one embodiment of a spacer according to the invention.
Figure 3B:
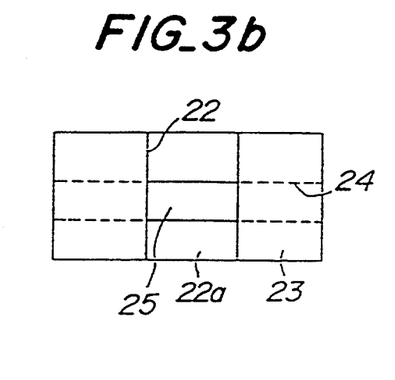
Figure 3C:
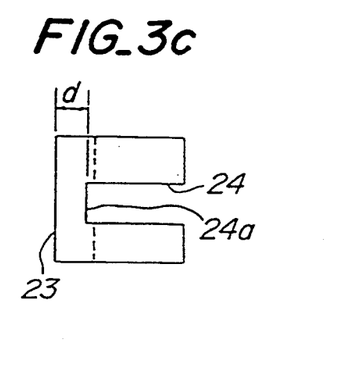

FIGS. 3a to 3c are schematic views showing one embodiment of the spacer 21. In this embodiment, the spacer 21 comprises a connection face 23 used for a connection with the optical fiber array 1, an accommodating portion 24 formed by a recess extended vertically to the connection face 23 and parallel to the optical fiber array, and the recess portion 22 formed by another recess extended parallel to the connection face 23 and vertically to the optical fiber array in the opposite side of the recess for the accommodating portion. Moreover, a bottom portion 24a of the accommodating portion 24 intersects a bottom portion 22a of the recess portion 22 to form a window portion 25 through which light beams are transmitted.

In this embodiment in which the recess portion 22 is formed by a space only, a distance d between the connection face 23 and the bottom portion 24a of the accommodating portion 24 is set to a focal length of the GRIN lens 12 of the microlens array 11. This is because, after the optical collimator array 31 is assembled as shown in FIG. 1, a distance between the end of the GRIN lens 12 and the end of the optical fiber 5 can be set to a focal length of the GRIN lens 12 completely. For example, a dimension of the optical fiber array is 5×5×2 mm, and a dimension of the spacer 21 is 5×2×2 mm. Moreover, a focal length of the microlens array 11 is for example 600 um.

Figure 4:
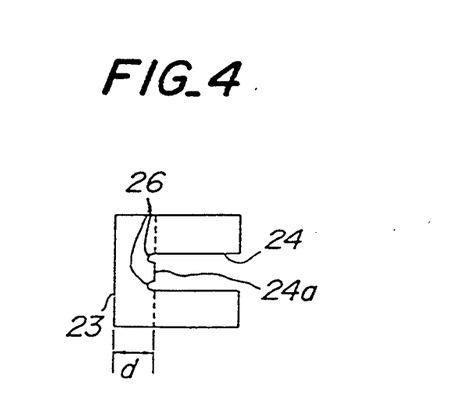
FIG. 4 is a schematic view showing another embodiment of the spacer according to the invention.

FIG. 4 is a schematic view showing the another embodiment of the spacer 21 corresponding to the embodiment illustrated in FIG. 3c. In the embodiment shown in FIG. 4, in addition to the embodiment illustrated in FIG. 3c, grooves 26 toward the connection face 23 are arranged in both side portions of the bottom portion 24a of the accommodating portion 24. Therefore, the both end portions of the bottom portion 24a do not become a right angle, and the both end portions become an R shape as shown in FIG. 4. As a result, it is possible to eliminate the drawback such that the distance d can not set to a focal length completely when the microlens array 11 is set to the accommodating portion 24, and thus it is always possible to set the distance d between the end of the microlens array 11 and the connection face 23 to a focal length precisely.

Figure 5:
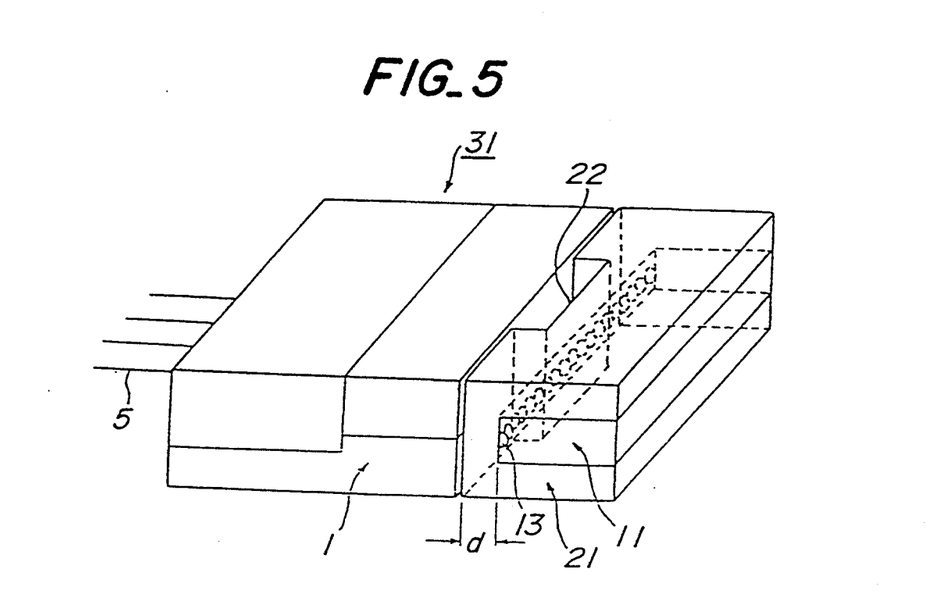
FIG. 5 is a schematic view illustrating another embodiment of the optical collimator array according to the invention.

In the optical collimator array mentioned above, if a precise working operation is performed with respect to the spacer 21 only in such a manner that the distance between the bottom portion 24a and the connection face 23 is set to the predetermined distance i.e., a focal length, it is easy to assemble the optical collimator array 31 in which the distance between the optical fiber array 1 and the microlens array 11 is set to a focal length precisely. FIG. 5 is a schematic view showing another embodiment of the optical collimator array 31 according to the invention. In the embodiment shown in FIG. 5, microlenses 13 are arranged at a portion of the microlens array 11 disposed in the window portion in stead of the GRIN lenses 12.

Figure 6:
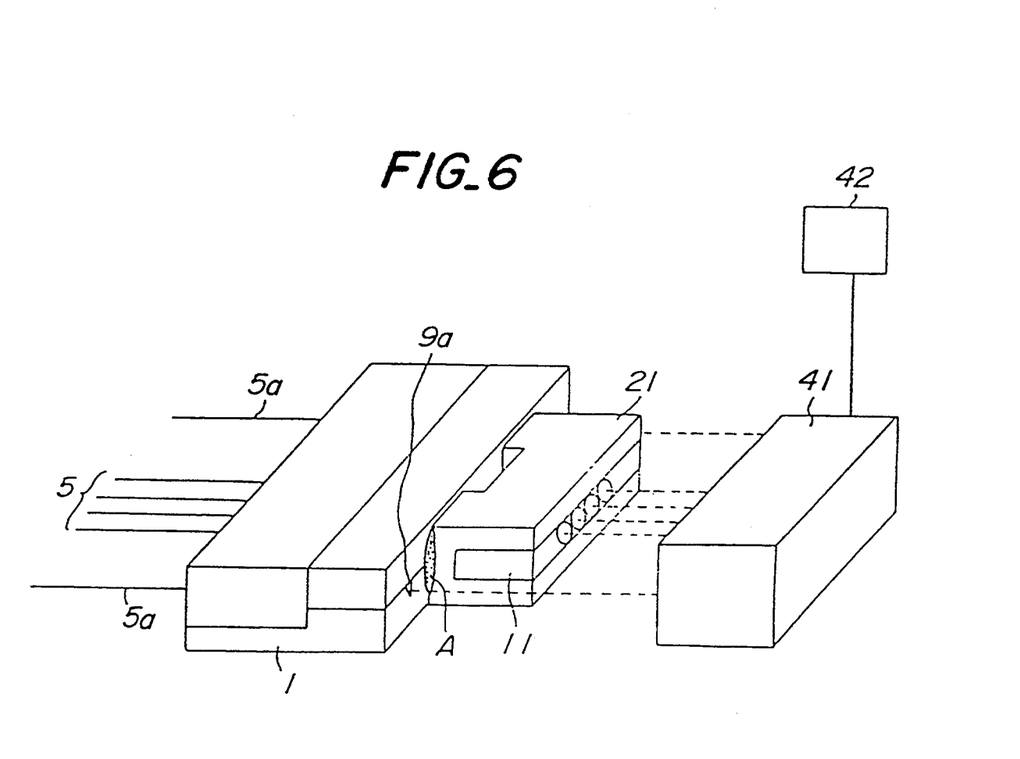
FIG. 6 is a schematic view for explaining a method of aligning light axes between the optical fibers and the microlenses.
Figure 7:
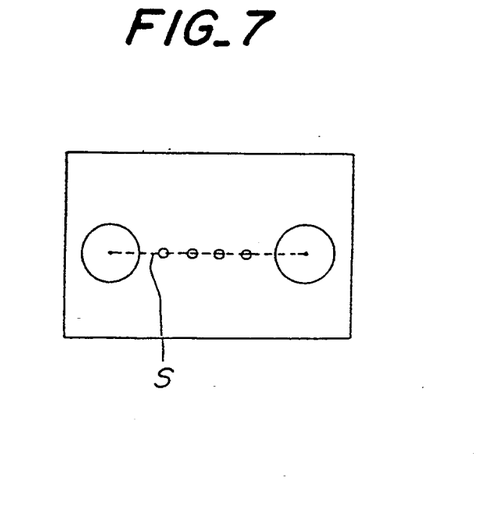
FIG. 7 is a schematic view depicting a monitor image.

FIG. 6 is a schematic view for explaining a method of aligning light axes when assembling the optical collimator array according to the invention, and FIG. 7 is a schematic view illustrating a monitor image picked up by a CCD camera during the aligning operation. At first, an optical fiber array 1 for an alignment having extended portions at both side portions of the optical fiber array 1 having a final shape is prepared. In the extended portions, V grooves 9a are formed to be parallel to the V grooves 9, and reference optical fibers 5a are arranged in the V grooves 9a. In this manner, the optical fiber array 1 for an alignment having the reference optical fibers 5a arranged on the same plane of the optical fibers 5. In the optical fiber array 1 for an alignment, the V grooves 9a are positioned outside of the spacer 21, and are positioned at a portion affected by an adhesive protrude portion A shown in FIG. 6. Then, the spacer 21 accommodating the microlens array 11 is connected to the optical fiber array 1 for an alignment thus obtained. Hereinafter, the light axis adjustment when the above connecting operation is performed will be explained.

At first, a light beam is made incident upon the optical fibers 5 of the optical fiber array 1 and also upon the reference optical fibers 5a. Then, light beams emitted from the GRIN lenses 12 of the microlens array 11 via the optical fibers 5 and light beams emitted directly from the reference optical fibers 5a are picked up by a CCD camera 41. The picked up light beams are displayed on a monitor 42 as a light spot as shown in FIG. 7. Then, centers in the light spots generated by the light beams from the reference optical fibers 5a are detected, and the thus obtained centers are connected by a reference line S on the monitor 42. After that, a positional relation between the optical fiber array 1 and the spacer 21 is adjusted in such a manner that all the light spots generated by the light beams from the optical fibers 5 are positioned on the reference line S and are not varied from each other. Then, the spacer 21 is fixed to the optical fiber array 1 by using, for example, adhesives of ultraviolet hardening type.

Figure 8:
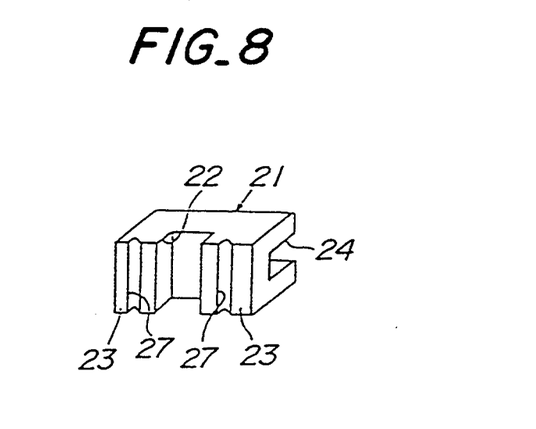
FIG. 8 is a schematic view showing another embodiment of the spacer according to the invention.

FIG. 8 is a schematic view showing another embodiment of the spacer 21 preferably used for the light axis alignment according to the invention. In the spacer 21 shown in FIG. 8, a whole dimension of the spacer 21 is decreased, and adhesive relief recesses 27 are arranged in the connection face 23. If the spacer 21 having the construction mentioned above is used, it is possible to eliminate the adhesive protruding portion A in FIG. 6, and to make small the pitch of the reference optical fiber 5a since the spacer 21 has a small dimension. In this case, if an image pickup region of the CCD camera 41 is small, it is possible to detect the reference light spots.

Figure 9:
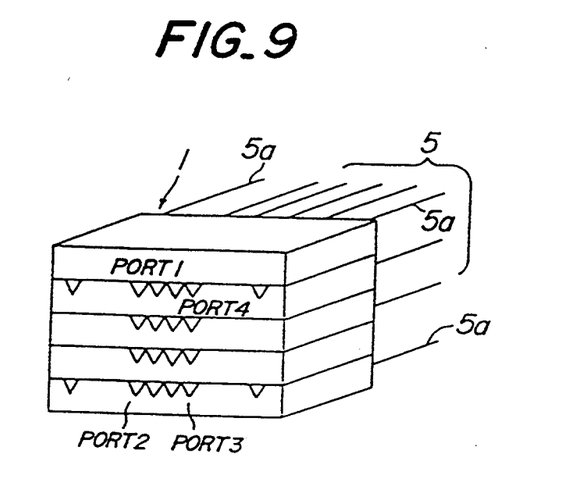
FIG. 9 is a schematic view illustrating another embodiment of the optical fiber array according to the invention.
Figure 10:
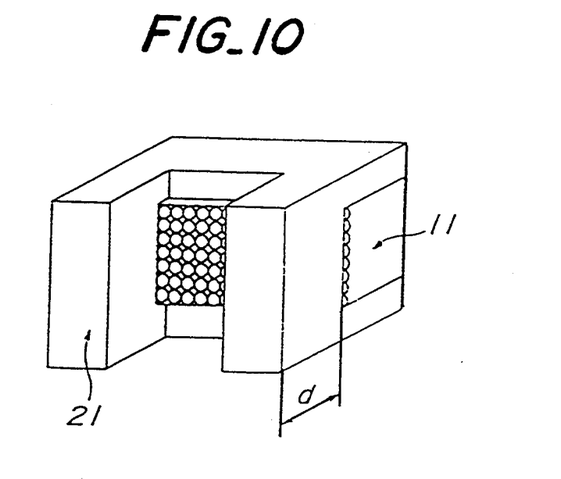
FIG. 10 is a schematic view depicting one embodiment of a combination of the microlens array and the spacer.

FIG. 9 is a schematic view showing another embodiment of the optical fiber array 1 according to the invention, and FIG. 10 is a schematic view illustrating one combination of the microlens array 11 and the spacer 21. In the embodiments shown in FIGS. 9 and 10, a different point from the embodiments shown in the previous figures is that a two-dimensional optical fiber array 1 is used. That is to say, the optical fibers 5 are aligned in the horizontal direction and also aligned in the vertical direction.

Figure 11:
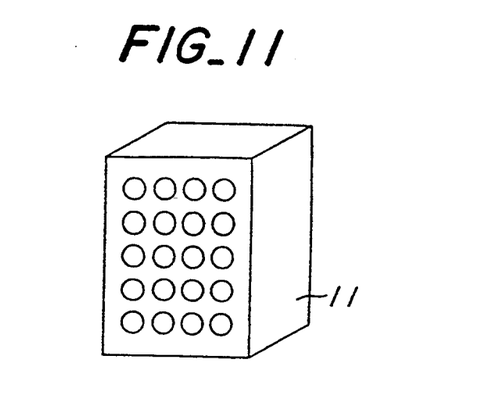
FIG. 11 is a schematic view showing another embodiment of the microlens array.

In the embodiment shown in FIG. 9, four V groove substrates each having four optical fibers 5 in the horizontal direction are stacked, and the reference optical fibers 5a are arranged at both side portions of the uppermost V groove substrate and the lowermost V groove substrate. The microlens array 11 and the spacer 21 used in FIG. 9 are the substantially same constructions as those of the previous embodiments, and, as shown in FIG. 10, they have dimensions extending in the vertical direction by the number of the V groove substrates to be used. Therefore, the microlens array 11 is a two-dimensional microlens array as shown in FIG. 11.

Figure 12:
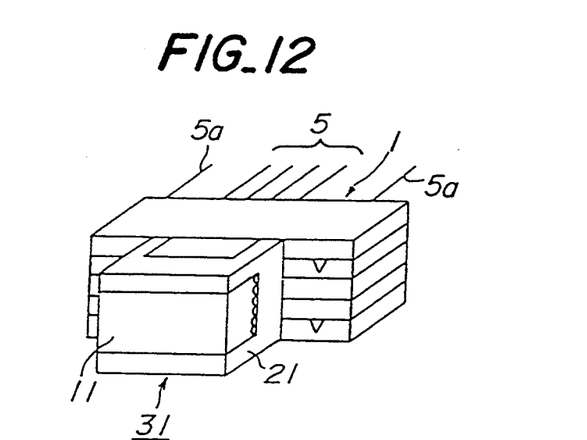
FIG. 12 is a schematic view illustrating another embodiment of the optical collimator array according to the invention.
Figure 13:
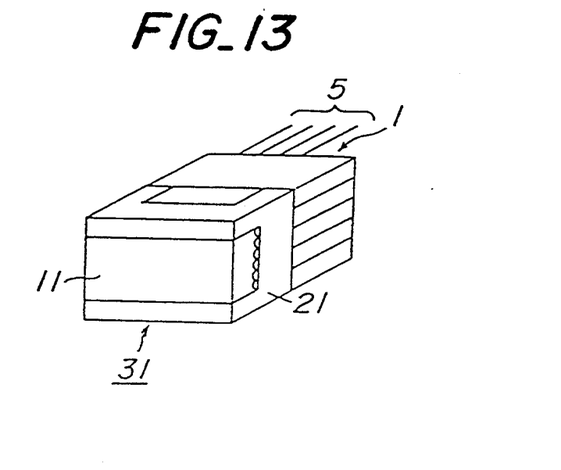
FIG. 13 is a schematic view depicting another embodiment of the optical collimator array according to the invention.

FIG. 12 is a schematic view showing another embodiment of the optical collimator array according to the invention. In FIG. 12, the optical fiber array 1 shown in FIG. 9 and the microlens array 11 and the spacer 12 shown in FIG. 10 are combined to form the optical collimator array 31 having the portions arranging the reference optical fibers 5a. Moreover, in FIG. 13, the optical collimator array 31, in which the portions arranging the reference optical fibers 5a are cut out after the light axis alignment is finished, is shown. The optical collimator arrays 31 shown in FIGS. 9 and 10 have fundamentally the same constructions as those of the one-dimensional optical collimator arrays 31 mentioned above.

In the two-dimensional optical collimator arrays 31 shown in FIGS. 9 to 13, the light axis alignment is performed fundamentally in the same manner as those of the one-dimensional optical collimator arrays 31 mentioned above. Also in the two-dimensional optical collimator arrays 31, it is sufficient to arrange at least one set of the reference optical fibers 5 at both side portions of at least one V groove substrate consisting of the two-dimensional optical fiber array 1. However, it is preferred to arrange two sets of the reference optical fibers 5 at both side portions of the uppermost V groove substrate and the lowermost V groove substrate.

Figure 14:
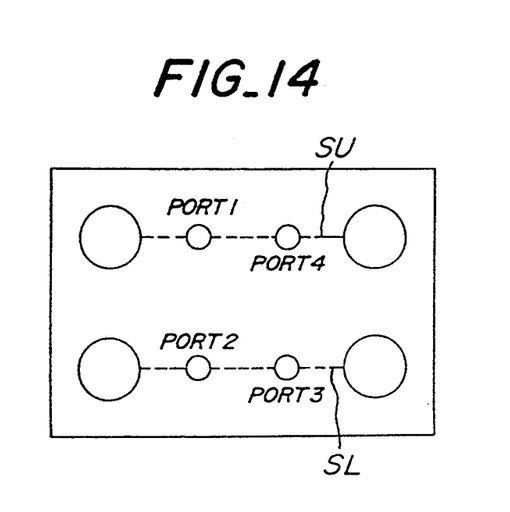
FIG. 14 is a schematic view showing another monitor image.

At first, a light beam is made incident upon the optical fibers 5 only at the positions marked by PORT-1–PORT4 in FIG. 9 and also upon the reference optical fibers 5a. Then, light beams emitted from the microlens array 11 via the optical fibers 5 and light beams emitted directly from the reference optical fibers 5a are picked up by a CCD camera 41. The picked up light beams are displayed on a monitor 42 as light spots as shown in FIG. 14. Then, centers in the light spots generated by the light beams from each set of the reference optical fibers 5a are detected, and the thus obtained centers of each sets are connected by reference lines SU and SL on the monitor 42. After that, a positional relation between the optical fiber array 1 and the spacer 21 is adjusted in such a manner that (1) the light spots PORT1 and PORT4; and PORT2 and PORT3 are positioned on the reference lines SU and SL and are not varied each other, and (2) the light spots PORT1 and PORT4 are vertically coincident with the light spots PORT2 and PORT3, respectively. Then, the spacer 21 is fixed to the optical fiber array 1 by using, for example, adhesives of ultraviolet hardening type. It should be noted that a light beam may be made incident upon all the optical fibers 5. Moreover, since it is necessary to form the two-dimensional optical fiber array 1 precisely, it is preferred to form the optical fiber array 1 in the manner disclosed in U.S. patent application Ser. No. 08/036871 or in Japanese Patent Application No. hei 5-49312.

The present invention is not limited to the embodiments mentioned above, but various modifications are possible. For example, in the embodiment mentioned above, the recess portion 22 is a space. However, if only an optical distance between the microlens array 11 and the optical fiber array 1 is always set to a predetermined distance i.e. a focal length, an optical member may be inserted into the recess portion 22.

As clearly understood from the above, according to the optical collimator array of the invention, since the optical fiber array, the spacer, and the microlens array are connected integrally to form the collimator array, it is possible to obtain the optical collimator array having a high strength and easy in manufacturing, and thus it is possible to provide easy handling of the optical collimator array. Moreover, the spacer has a recess with window portion having a depth with respect to the face thereof connected to the optical fiber array. Therefore, if the microlens array is set in the recess window portion of the spacer in which one end portion of the microlens array is disposed to the window, and the spacer integrally connected with the microlens array is fixed to the optical fiber array, it is possible to adjust precisely a distance between one end of the optical fiber array and one end of the microlens array at a predetermined distance i.e., a focal length. As a result, it is possible to increase a converting efficiency from diverging light to parallel light.

Moreover, according to the method of aligning light axes in the collimator array mentioned above, at least one set of reference optical fibers is arranged at both side portions of the optical fibers in the optical fiber array, and an axes adjustment between the optical fibers and the microlenses is performed by referring a line on the monitor generated between one reference fiber and the other reference fiber. In this case, even if the optical fiber array and the microlens array are varied in a thickness direction i.e., parallel, the spots on the monitor are not aligned in one direction i.e., on the line, and thus it is understood that the optical fiber array and the microlens array are not arranged properly. Therefore, it is possible to perform a light axes alignment between the optical fibers and the microlenses precisely in an easy manner.

What is claimed is:

1. An optical collimator array, comprising:
   an optical fiber array including a plurality of optical fibers;
   a microlens array including a plurality of lenses, said lenses being optically aligned with respective optical fibers of the optical fiber array; and
   a spacer for connecting the microlens array to the optical fiber array, said spacer having a spacer body which includes a connecting surface which is joined to said optical fiber array, a first recess which receives the microlens array, said first recess extending through the spacer body along a first direction toward said connecting surface, and a second recess formed in said connecting surface of said spacer body and extending along a second direction which is opposite said first direction to intersect the first recess, thereby forming an open window portion through which light beams are irradiated from the optical fiber array.

2. The optical collimator array of claim 1, wherein said microlens array is secured in said first recess such that one end of the microlens array is disposed at said open window portion.

3. The optical collimator array of claim 1, wherein said optical fiber array and said microlens array are each two-dimensional, the optical fibers and the lenses being arranged two-dimensionally.

4. The optical collimator array of claim 1, wherein said optical fiber array includes at least one pair of reference optical fibers, each reference optical fiber of said at least one pair of reference optical fibers being arranged at opposite side portions of the optical fiber array, such that said optical fibers and said at least one pair of reference optical fibers are coplanar.

5. The optical collimator array of claim 1, wherein said spacer further includes grooves formed in an end surface bounding said first recess toward said connecting surface, said grooves extending toward said connecting surface.

6. The optical collimator array of claim 1, wherein said spacer further includes adhesive relief recesses formed in said connecting surface.

* * * * *